United States Patent
Hoffmann et al.

(10) Patent No.: US 10,580,142 B1
(45) Date of Patent: Mar. 3, 2020

(54) SYSTEM AND METHOD FOR SELF-ORGANIZED CRITICAL IMAGE SEGMENTATION

(71) Applicant: HRL Laboratories, LLC, Malibu, CA (US)

(72) Inventors: Heiko Hoffmann, Simi Valley, CA (US); David W. Payton, Calabasas, CA (US)

(73) Assignee: HRL Laboratories, LLC, Malibu, CA (US)

( * ) Notice: Subject to any disclaimer, the term of this patent is extended or adjusted under 35 U.S.C. 154(b) by 331 days.

(21) Appl. No.: 15/480,319

(22) Filed: Apr. 5, 2017

Related U.S. Application Data

(63) Continuation-in-part of application No. 14/747,407, filed on Jun. 23, 2015, now abandoned.

(60) Provisional application No. 62/015,871, filed on Jun. 23, 2014, provisional application No. 62/319,042, filed on Apr. 6, 2016.

(51) Int. Cl.
  *G06T 7/11* (2017.01)
  *G06T 7/194* (2017.01)
(52) U.S. Cl.
  CPC .............. *G06T 7/194* (2017.01); *G06T 7/11* (2017.01)
(58) Field of Classification Search
  USPC ........................................................ 700/47
  See application file for complete search history.

(56) References Cited

U.S. PATENT DOCUMENTS

2007/0298821 A1   12/2007   Bush

OTHER PUBLICATIONS

Gharib et al., "Toward Application of Sandpile Model in Image Segmentation Based on Extremal Optimization Heuristic" National Congress on Electrical Engineering, Computer and Information Technology, 2013 5 Pgs., (Year: 2013).*

Melkemi et al., "A multiagent system approach for image segmentation using genetic algorithms and extremal optimization heuristics" Pattern Recognition Letters 27 (2006) pp. 1230-1238 (Year: 2006).*

Griesser et al., "GPU-Based Foreground-Background Segmentation using an Extended Colinearity Criterion" Proceedings of Vision, Modeling and Visualization 2005, pp. 319-326 (Year: 2005).*

(Continued)

*Primary Examiner* — Emilio J Saavedra
(74) *Attorney, Agent, or Firm* — Tope-McKay & Associates

(57) ABSTRACT

Described is a system for self-organized critical image segmentation. During operation, the system generates a delta pattern from a self-organized critical process. An initial test pattern is then altered based on the delta pattern to generate a new test pattern. The new test pattern is a mask identifying distinct regions in an image. A new energy score is then generated of the new test pattern. The operations of generating the delta pattern and altering the initial test pattern are then repeated until an energy score of the new test pattern is less than an energy score of the initial test pattern. At that point, the initial test pattern is replaced with the new test pattern. Finally, the process is repeated until a termination condition is reached, at which point the new test pattern provides the image segmentation by dividing the image into distinct regions, including a foreground and background.

27 Claims, 7 Drawing Sheets

(56) References Cited

OTHER PUBLICATIONS

Optimization by Simulated Annealing. S. Kirkpatrick, C. D. Gelatt, Jr., M. P. Vecchi, Science, vol. 220, No. 4598, pp. 671-682, May 1983.

Self-Organized Criticality. Henrik Jeldtoft Jensen, Cambridge University Press, 1998. Chapter 3, pp. 12-28.

Self-Organized Criticality: An Explanation of 1/f Noise. P. Bak, C. Tang, K. Wiesenfeld, Physical Review Letters, vol. 59, No. 4, pp. 381-384, 1987.

Emergent Criticality in Complex Turing B-Type Atomic Switch Networks. A. Z. Stieg, a. V. Avizienis, H. O. Sillin, C. Martin-Olmos, M. Aono, J. K. Gimzewski, Advanced Materials, vol. 24, Issue 2, pp. 286-293, Jan. 10, 2012.

Theory of Quantum Annealing of an Ising Spin Glass. G. E. Santoro, R. Martonak, E. Tosatti, R. Car, Science, vol. 295, pp. 2427-2430, Mar. 2002.

Office Action 1 for U.S. Appl. No. 141747,407, dated Jul. 28, 2017.

Fernandes et al., "Self-Organized Critically Mutation Operator for Dynamic Optimization Problems" ACM GECCO '08, Jul. 12-16 2008, pp. 937-944.

Turcotte, "Self-organized Criticality" Rep. Prog. Phys. 62 (1999), pp. 1377-1429.

Interactive Graph Cuts for Optimal Boundary & Region Segmentation of Objects in N-D Images. Yuri Y. Boykov and Marie-Pierre Jolly. ICCV 2001, pp. 105-112.

Efficiently Solving Dynamic Markov Random Fields using Graph Cuts. Pushmeet Kohli and Philip H. S. Torr. ICCV 2005, pp. 1-8.

Self-Organized Criticality. Henrik Jeldtoft Jensen, Cambridge University Press, 1998, pp. 1-8 and 126-127.

A Markov random field image segmentation model for color textured images. Zoltan Kato and Ting-Chuen Pong, Image and Vision Computing 24 (2006), pp. 1103-1114.

Response to Office Action 1 for U.S. Appl. No. 14/747,407, dated Nov. 28, 2017.

Office Action 2 for U.S. Appl. No. 14/747,407, dated Mar. 28, 2018.

Sun et al., "Population-based Extremal Optimization Algorithm for Hot Rolling Scheduling Problem" Journal of Computational Information Systems, vol. 6 No. 7, Jul. 2010, pp. 2415-2422.

Lassee, "Towards new Order" Presentation Dec. 3, 2003.

Notice of Abandonment for U.S. Appl. No. 14/747,407, dated Feb. 11, 2019.

* cited by examiner

SYSTEM AND METHOD FOR SELF-ORGANIZED CRITICAL IMAGE SEGMENTATION

CROSS-REFERENCE TO RELATED APPLICATIONS

This is as Continuation-in-Part application of U.S. application Ser. No. 14/747,407, filed on Jun. 23, 2015, which is a non-provisional application of U.S. Provisional Application No. 62/015,871, filed on Jun. 23, 2014.

This is ALSO a non-provisional patent application of U.S. Provisional Application No. 62/319,042, filed on Apr. 6, 2016, the entirety of which is hereby incorporated by reference.

BACKGROUND OF INVENTION

(1) Field of Invention

The present invention relates to an image segmentation system and, more specifically, to an image segmentation system that separates foreground objects from background imagery.

(2) Description of Related Art

Image segmentation is the process by which foreground objects are separated from background imagery. Image segmentation requires an optimization method that can cope with many local minima within the image. A common technique for image segmentation is to use Markov Random Fields (see Literature Reference Nos. 1 and 2). In this process, an energy function is defined over the whole pixel array and optimization methods are used to minimize this energy. An open problem is to find a suitable optimization method that is computationally efficient, but does not get trapped in local minima.

A common technique to address this optimization problem is "Simulated annealing" (SA) (see the List of Incorporated Literature References, Literature Reference No. 3). SA is motivated by real annealing, in which slowly reducing the temperature of a lattice results in a lower-energy state. SA uses an annealing scheme to avoid local minima. The operation of the algorithm proceeds as follows. SA randomly searches for the optimal pattern. A new pattern is accepted if it lowers the energy or cost. Occasionally, however, also a pattern of higher cost is accepted based on a thermodynamic rule. The probability for accepting such a pattern varies as $\exp(-dE/kT)$, where dE is the difference in cost, k a constant, and T the simulated temperature. During annealing, T is gradually lowered from $T_0$ to 0. This non-zero probability (for $T>0$) enables the algorithm to escape a local minimum.

The disadvantage of SA is its dependence on the annealing scheme and parameters. The performance of SA critically depends on $T_0$ and k. Moreover, before an optimization problem is solved, it is unknown how many annealing steps are required. This limitation is a big disadvantage for SA, because once the annealing reaches the T=0 state, the algorithm does not improve anymore. Instead, SA has to be restarted with a new pre-defined number of annealing steps.

In other art, random search for optimization is much simpler and does not have these problems. However, random search gets trapped into local minima and, therefore, often does not provide a suitable solution.

Thus, a continuing need exists for an image segmentation system that separates foreground objects from background imagery using useful search patterns for optimization to increase computational efficiency and reduce errors.

SUMMARY OF INVENTION

This disclosure provides is a system for self-organized critical image segmentation. The system includes one or more processors and a memory. The memory is, for example, a non-transitory computer-readable medium having executable instructions encoded thereon, such that upon execution of the instructions, the one or more processors perform several operations. During operation, the system generates a delta pattern from a self-organized critical process. An initial test pattern is then altered based on the delta pattern to generate a new test pattern. The new test pattern is a mask identifying distinct regions in an image. A new energy score is then generated of the new test pattern. The operations of generating the delta pattern and altering the initial test pattern are then repeated until an energy score of the new test pattern is less than an energy score of the initial test pattern. At that point, the initial test pattern is replaced with the new test pattern. Finally, the process is repeated until a termination condition is reached, at which point the new test pattern provides the image segmentation with each pixel of the new test pattern being assigned with a label. The new test pattern labelled as a foreground object is then received in an object tracking system and thereafter tracked by the object tracking system.

In another aspect, the energy score of the new test pattern is determined based on a Markov Random Fields (MRF) energy.

In yet another aspect, the termination condition is selected from a group consisting of a predetermined target energy score, convergence of energy scores of the initial test pattern and new test pattern, or a predetermined iteration number limit is reached.

In another aspect, the initial test pattern is randomly generated based on a number of desired distinct regions.

Further, in altering an initial test pattern based on the delta pattern, the elements of the initial test pattern have a one-to-one correspondence with image pixels.

In another aspect, in altering the initial test pattern based on the delta pattern, if a pixel in the test pattern corresponds to a 1 element in the delta pattern, then a pixel value associated with the pixel is changed from 0 to 1 or from 1 to 0 and all other pixel values are left unchanged.

In yet another aspect, in altering the initial test pattern based on the delta pattern, if a pixel in the test pattern corresponds to a 1 element in the delta pattern, then a pixel value in the test pattern associated with the pixel is changed from x to (x+1) modulo k where k is the number of distinct image regions, and all other pixel values are left unchanged.

Further, in altering an initial test pattern based on the delta pattern, the distinct image regions are foreground and background.

In yet another aspect, in generating the delta pattern, the delta pattern is generated based on a computer model of a sand pile.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
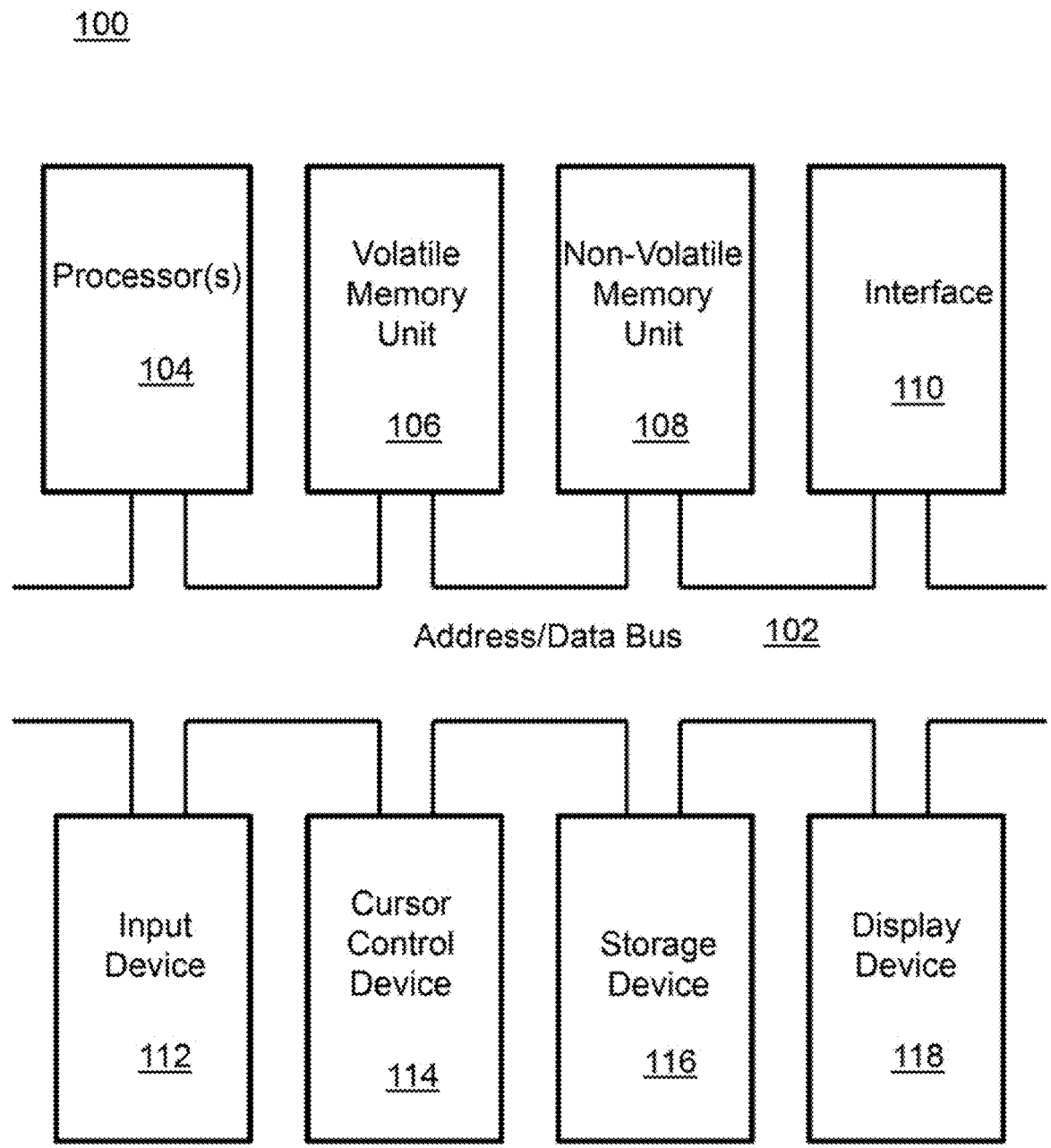
FIG. 1 is a block diagram depicting the components of a system according to various embodiments of the present invention.

The present invention relates to an image segmentation system and, more specifically, to an image segmentation system that separates foreground objects from background imagery. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Subsequently, an introduction provides the reader with a general understanding of the present invention. Finally, specific details of various embodiment of the present invention are provided to give an understanding of the specific aspects.

(1) List of Incorporated Literature References

The following references are cited throughout this application. For clarity and convenience, the references are listed herein as a central resource for the reader. The following references are hereby incorporated by reference as though fully set forth herein. The references are cited in the application by referring to the corresponding literature reference number, as follows:

1. Interactive Graph Cuts for Optimal Boundary & Region Segmentation of Objects in N-D Images. Yuri Y. Boykov and Marie-Pierre Jolly. ICCV 2001.
2. Efficiently Solving Dynamic Markov Random Fields using Graph Cuts. Pushmeet Kohli and Philip H. S. Torr. ICCV 2005.
3. Optimization by Simulated Annealing. S. Kirkpatrick, C. D. Gelatt, Jr., M. P. Vecchi, Science, Volume 220, Number 4598, pages 671-682, May 1983.
4. Self-Organized Criticality. Henrik Jeldtoft Jensen, Cambridge University Press, 1998.
5. Self-Organized Criticality: An Explanation of 1/f Noise. P. Bak, C. Tang, K. Wiesenfeld, Physical Review Letters, Volume 59, Number 4, pages 381-384, 1987.
6. Emergent Criticality in Complex Turing B-Type Atomic Switch Networks. A. Z. Stieg, A. V. Avizienis, H. O. Sillin, C. Martin-Olmos, M. Aono, J. K. Gimzewski, Advanced Materials, Volume 24, Issue 2, pages 286-293, Jan. 10, 2012.
7. Theory of Quantum Annealing of an Ising Spin Glass. G. E. Santoro, R. Martonak, E. Tosatti, R. Car, Science, Volume 295, pages 2427-2430, March 2002.
8. A Markov random field image segmentation model for color textured images. Zoltan Kato and Ting-Chuen Pong, Image and Vision Computing 24 (2006) 1103-1114.

(2) Principal Aspects

Various embodiments of the invention include three "principal" aspects. The first is a system for image segmentation. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
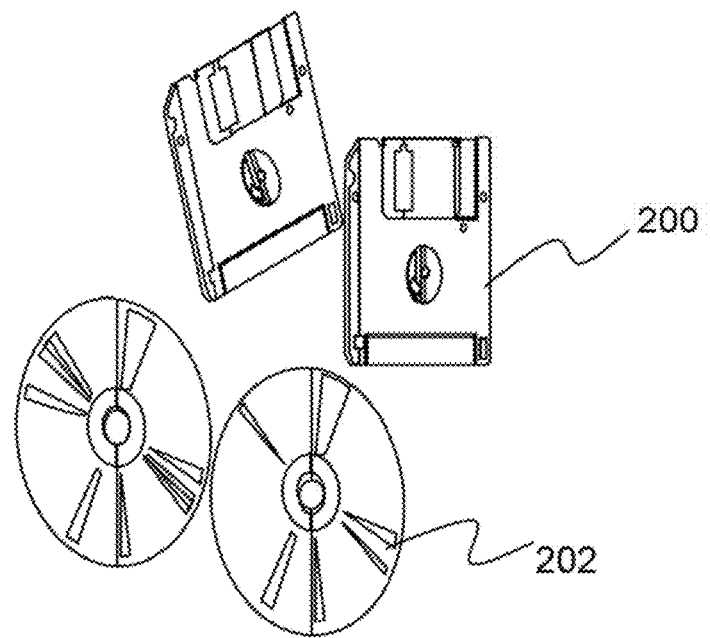
FIG. 2 is an illustration of a computer program product embodying an aspect of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Introduction

This disclosure provides a system and method for image segmentation. The system uses a process that is self-organized critical (SOC) to find each pixel's label (e.g., foreground/background). For segmentation, an energy function is defined over the array of image pixels. The energy function penalizes color and/or pattern differences between neighboring pixels of the same label such that minimizing the energy yields the desired segmentation. To minimize the energy, a sequence of test patterns is generated that define each pixel's label. Initially, a random test pattern is created and then modified with successive delta patterns. In this system, an SOC process produces the delta patterns, which are SOC avalanches in an array parallel to the image array. The SOC process generates delta patterns and subsequently test patterns changing the labels of the pixels until the corresponding energy converges to a minimum. The low energy state corresponds to a label for each image and therefore to an image segmentation. Areas where the test pattern equals to one, for example, are designated as part of the foreground object in the image.

A purpose of this invention is to find better image segmentations more efficiently than state of the art methods. Particularly, the system of this disclosure can cope with local minima that arise when framing segmentation as an optimization problem. The system as described herein is about 10 times faster than simulated annealing, which is a state of the art optimization method. Moreover, the system does not require the tuning of parameters. In contrast, simulated annealing is sensitive to the proper choice of a temperature schedule.

Image segmentation is a key component for automatic sensor processing, particularly, for camera input. Thus, the system described herein can be used in a variety of applications, such as autonomous driving, or for the inspection of borehole cores or any type of object tracking requiring the separation of objects from background.

(4) Specific Details of Various Embodiments

Figure 3:
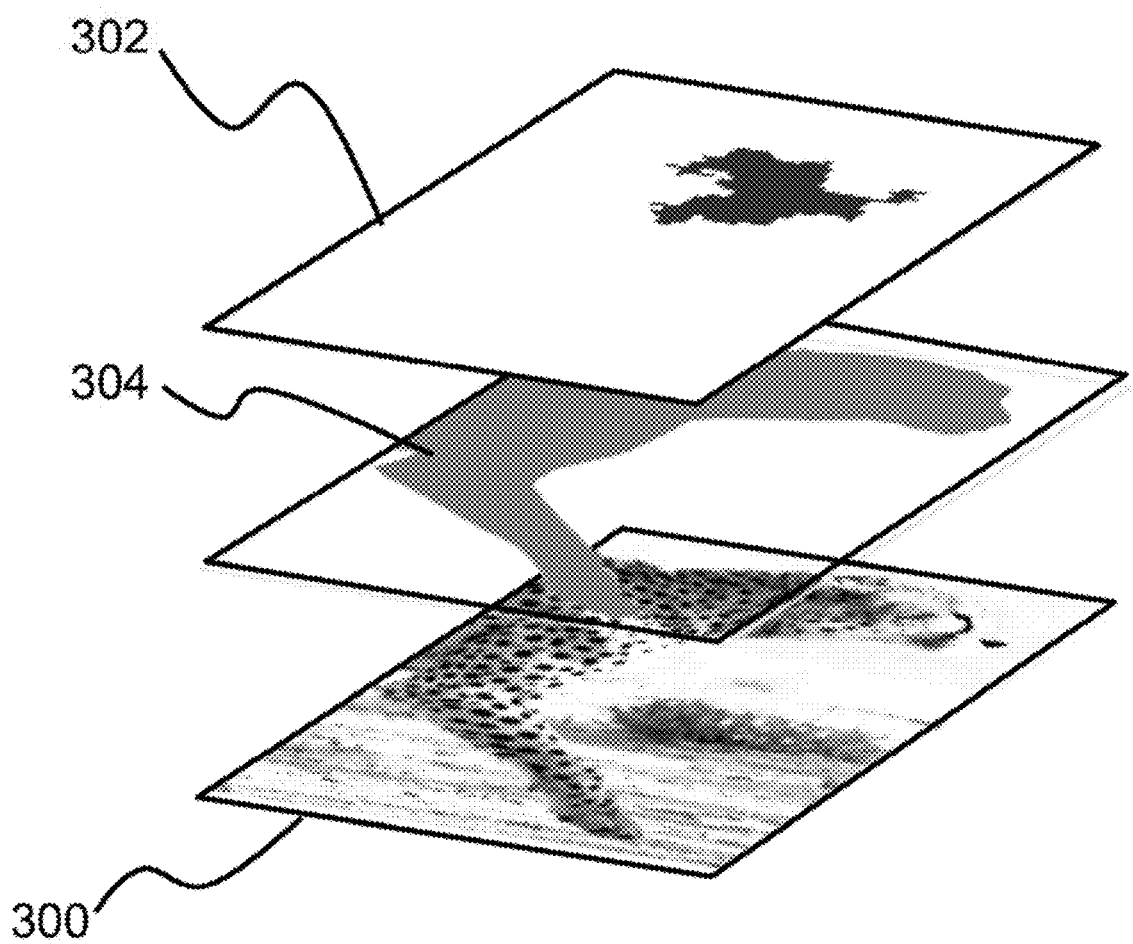
FIG. 3 is an illustration depicting key elements to the process of the system according to the principles of the present invention.

The system of this disclosure automatically segments images into distinct image regions, for example, separating foreground objects from the background. FIG. 3 is an illustration depicting key elements to the process. As shown, an image 300 is received into the system. A self-organized criticality (SOC) process is implemented in an array that is parallel to the image 300 array, that creates SOC avalanches 302 which alter a test pattern 304 that gets optimized for image segmentation. The test pattern is a mask that provides a class label for each image pixel, e.g., it designates which pixel is foreground and with is background. The initial test pattern is randomly chosen from a predefined (e.g., uniform) random distribution over the set of pixel labels. For example, if the number of desired classes is k, then the pixel labels are uniformly distributed between zero and k−1. If the system is seeking to segment between foreground and background, then the number of classes is 2 and the pixel labels are randomly set to 0 or 1.

Figure 4:
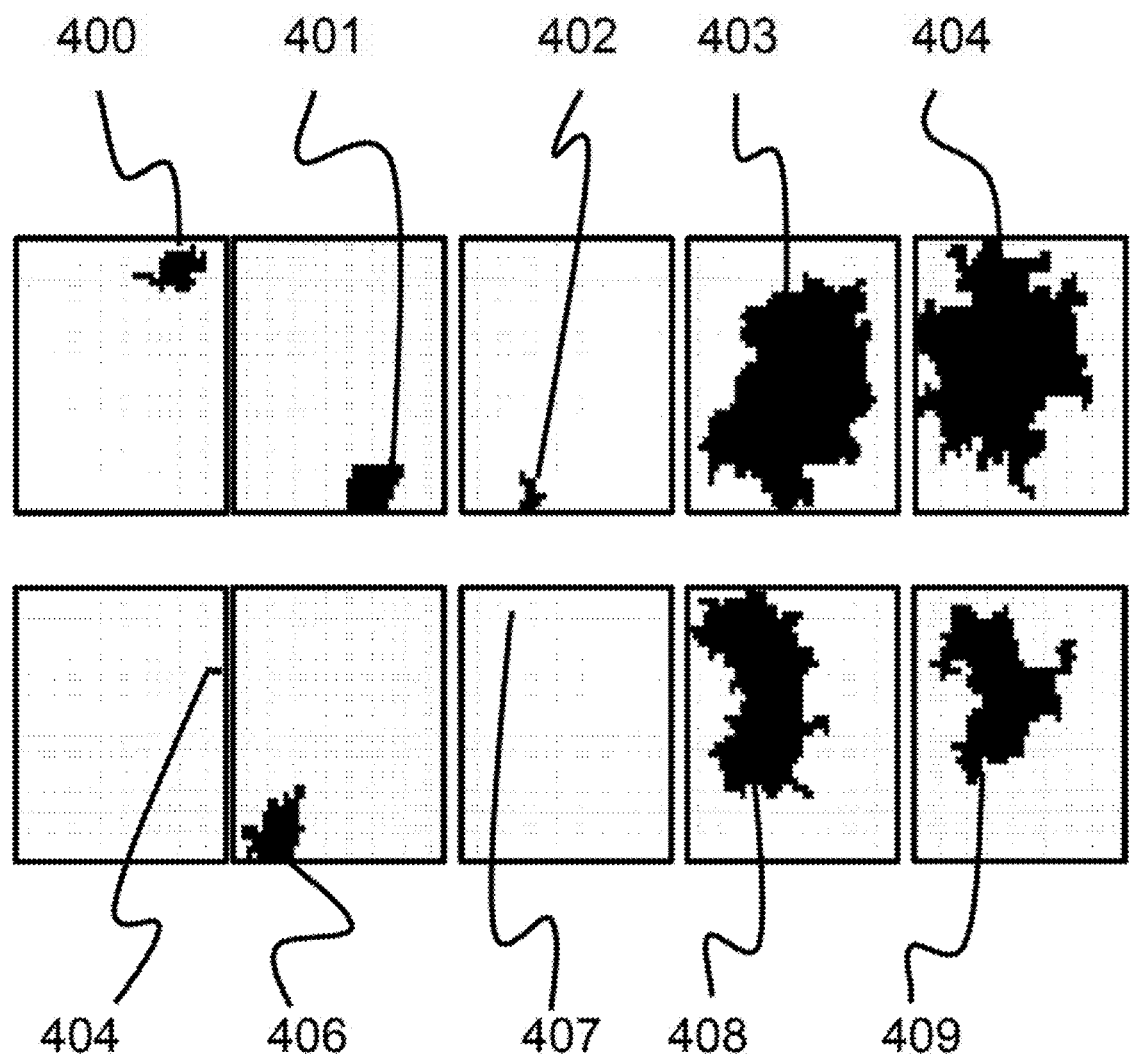
FIG. 4 is an illustration depicting examples of avalanche patterns on a 40×40 lattice as they occurred in series.

Self-organized criticality (SOC) has been demonstrated in certain complex systems that consist of a collection of components, interactions between these components, a local threshold that triggers an event, and an external driving force (see Literature Reference No. 4). A classical non-limiting illustrative example of such a system is a sand pile (see Literature Reference No. 5). The external driving force is a sand grain that is added one at a time to the pile. If locally the slope of the sand pile reaches a threshold, an avalanche may occur due to the interactions between the sand grains. Within an avalanche, there is a contiguous region where some grains have moved and this region has a boundary outside of which no grains have been disturbed. This contiguous region is referred to as the avalanche pattern. In an SOC system, the avalanche patterns have certain unique characteristics. One of these characteristics is that the probability distribution of pattern sizes follows a power law, where a large pattern of a certain size is less likely than a small pattern of a certain size (see Literature Reference No. 4). The system of this disclosure uses a device/method that can generate such avalanche patterns. A non-limiting example of such a method is the Bak-Tang-Wiesenfeld (BTW) model as described in Literature Reference No. 5. This model allows the system to generate avalanche patterns with computer simulations. For example, FIG. 4 is an illustration depicting examples of avalanche patterns 400 through 409 in the BTW model on a 40×40 lattice as they occurred in series.

In other art and as noted above, Markov Random Fields (MRF) have been used for image segmentation (see Literature Reference Nos. 1, 2, and 8). Here, each pixel is assigned a random variable, which labels the class for segmentation. Given a configuration of these variables, an energy function is defined (e.g., such an energy function is described in Literature Reference No. 2). This energy function favors, for example, pixels with similar color having the same label (see Literature Reference No. 2). The goal is to find a configuration of variables that minimize the energy function. The resulting configuration gives the desired segmentation.

Figure 5:
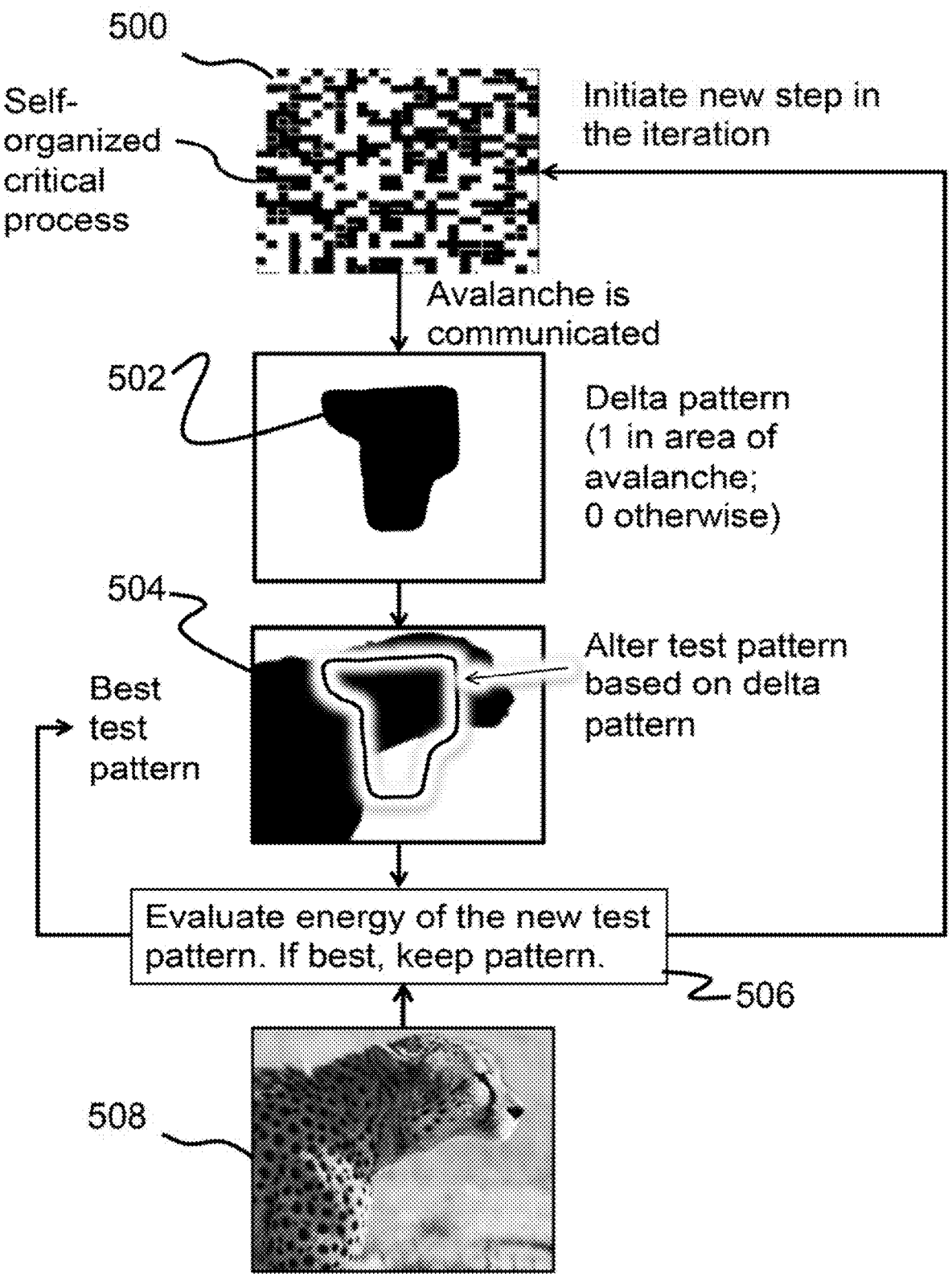
FIG. 5 is a flow chart depicting a process for optimizing a test pattern using a sandpile model to generate avalanches.

In the system of this disclosure and as shown in FIG. 5, such a series of avalanche patterns is used to progressively modify the search test pattern that defines the segmentation configuration. The pixels in an image 508 are brought into a one-to-one correspondence with the array 500 of an SOC model to produce an avalanche pattern 502. In other words, the pixels of the image 508 to be segmented map one-to-one onto the components 500 of the SOC model which, in various aspects, generates the avalanche pattern 502 based on a computer model of a sand pile.

In producing an avalanche pattern 502, every element within and including the avalanche boundary is considered to be a 1 and every element outside this boundary to be a 0. Then, for every element=1, by virtue of the one-to-one correspondence, the label of the corresponding pixel of the test pattern 504 is altered. A non-limiting example is to change the label from its current value x to (x+1)modulo(k), where k is the number of distinct image regions. Another non-limiting example of such alteration is to flip the label in the test pattern. For example, if a pixel of the test pattern 504 corresponds to a 1 element in the avalanche pattern 502, then the value of the pixel is changed either from background to foreground or from foreground to background. All other pixels are left unchanged. When an avalanche pattern 502 is used in this way, it is referred to as a delta-pattern because it is defining which parts of the test pattern 504 to change. This process of changing the pixel values is performed by a state-change module that, stated in another manner, determines a subset from the set of discrete states (e.g., with values being either background or foreground) that are to be altered or remain unchanged. These subsets of states to be altered or remain unchanged are obtained from the SOC process.

Beginning with an initial random test pattern, each avalanche pattern 502 is used as a delta-pattern to modify this test pattern 504. With each modification of the test pattern 504, the system employs an evaluation module that evaluates 506 the corresponding Markov Random Fields (MRF) energy (or score) and maintains a record of the current best score and corresponding state for that score. If this new energy value or score is smaller than any previous value or score, the new test pattern is used as the starting point for further search. Otherwise, if a previous value is smaller, then the new test pattern is discarded and the system continues to use the previous test pattern as the starting point.

Figure 6:
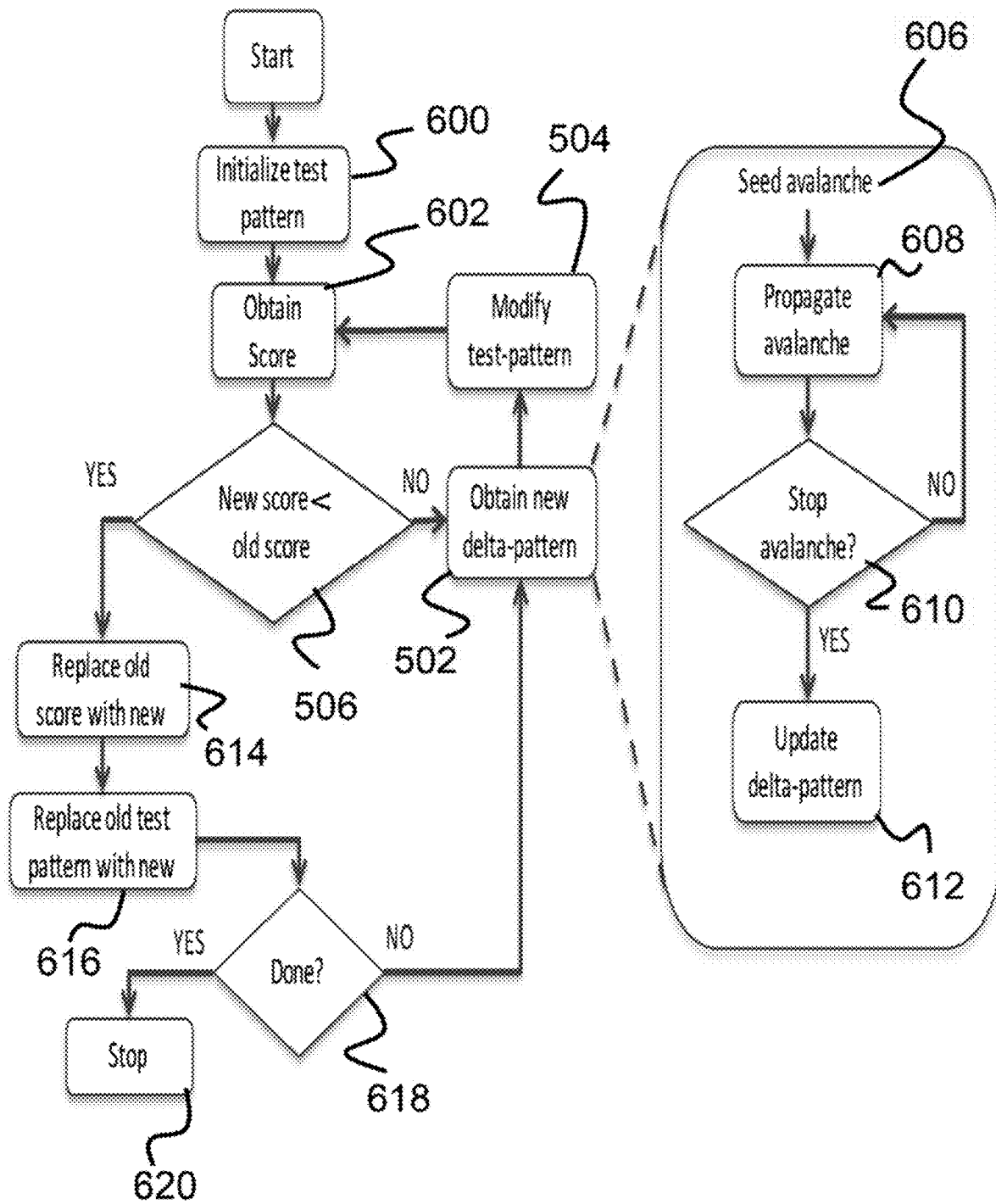
FIG. 6 is a flow chart depicting a process for optimizing a test pattern.

As shown in FIG. 6, this process continues until a termination condition occurs. For example, this iteration process continues until either a predetermined target energy score or value is reached by the evaluation module, the energy converges, or a predetermined iteration number limit is reached. In other words, the system employs an iteration mechanism that first determines a state change with the state-change module and then evaluates the score for that change with the evaluation module, and then repeats this process until the termination condition is reached. At this point, an approximation to the energy minimum is found, and the corresponding state provides an image segmentation. FIG. 6 is a flow chart depicting the process flow for optimizing the test pattern, including the iteration mechanism. As shown, a test pattern is initialized 600 and passed through the process as depicted in FIG. 5 to generate a score 602 or energy value. The score is, for example, the MRF energy value. The score is evaluated 506 against previous or old scores.

If there were not any previous scores or the new score is greater than or equal to any previous scores, then the system repeats the process as shown in FIG. 5 to obtain a new delta pattern (i.e., a new avalanche pattern 502) and modify or alter the test pattern 504. Based on the altered test pattern 504, a new score 602 is generated which can then be evaluated 506. The new delta pattern is generated by seeding 606 an avalanche based on the current SOC state 500. The avalanche propagates 608 until it stops 610, resulting in the updated or new delta pattern 612. The avalanche stops 610 according to the criteria of the self-organized critical model (see, for example, Literature Reference No. 5).

Alternatively, if the new score or value is smaller than the old or previous score, then the system replaces 614 the old score with the new score and replaces 616 the old test pattern with the new test pattern. As noted above, this process continues and is not done 618 until either a predetermined target energy score or value is reached, the energy converges, or a predetermined iteration limit is reached. At which point the system stops 620 and the new test pattern gives the image segmentation as distinct regions, such as a foreground object and background. This segmentation can be used for further processing by any number of applications, including object tracking systems, etc. For example, once the foreground object is segmented and designated as a foreground object to be tracked, a mobile platform (e.g., unmanned aerial vehicle, satellite, surveillance camera, autonomous car or robot, etc.) can be activated (via appropriate commands, etc.) to cause the mobile platform to follow or otherwise track the foreground object across successive video or image frames.

A major advantage of our new system over optimizing an MRF with an annealing scheme is that the system of this disclosure is invariant in time. Thus, a solution can always be further improved by simply running additional iteration steps. In addition, the process does not require the tuning of any parameters. Usually, parameter tuning takes up a lot of time in solving an optimization problem, and this time is usually not accounted for in performance evaluations comparing optimization methods.

To put the system into practice it is important to implement the SOC model efficiently to avoid additional computational overhead from the SOC process. A non-limiting example of an efficient implementation is to realize the SOC model in a graphics-processing unit (GPU). Most SOC models, like BTW, are suitable for parallelization, since the interacting components can be updated independently within the inner SOC iteration loop. Alternatively, one may create a dedicated hardware that produces SOC events. A non-limiting example of such hardware is described in Literature Reference No. 6. The produced events are fed through a wired connection to the processing unit that evaluates the cost of a search pattern.

To evaluate the optimization component of the system, the system was compared against a state of the art method (simulated annealing) on a standard benchmark test (see Literature Reference No. 7 for a description of standard benchmark test). This test involves finding the ground state of an Ising Spin Glass. For purposes of demonstration, an 80×80 lattice of spin $s_i$ was used, which can have two states 1 and −1. Thus, when an avalanche occurred, the sign of each underlying spin was simply inverted (flipped). The function to optimize is $$E=\Sigma J_{ij}s_is_j,$$

where J is the coupling matrix between the spins. J is non-zero only for nearest neighbors, and the $J_{ij}$ were chosen randomly uniformly from the interval (−2; 2).

Figure 7:
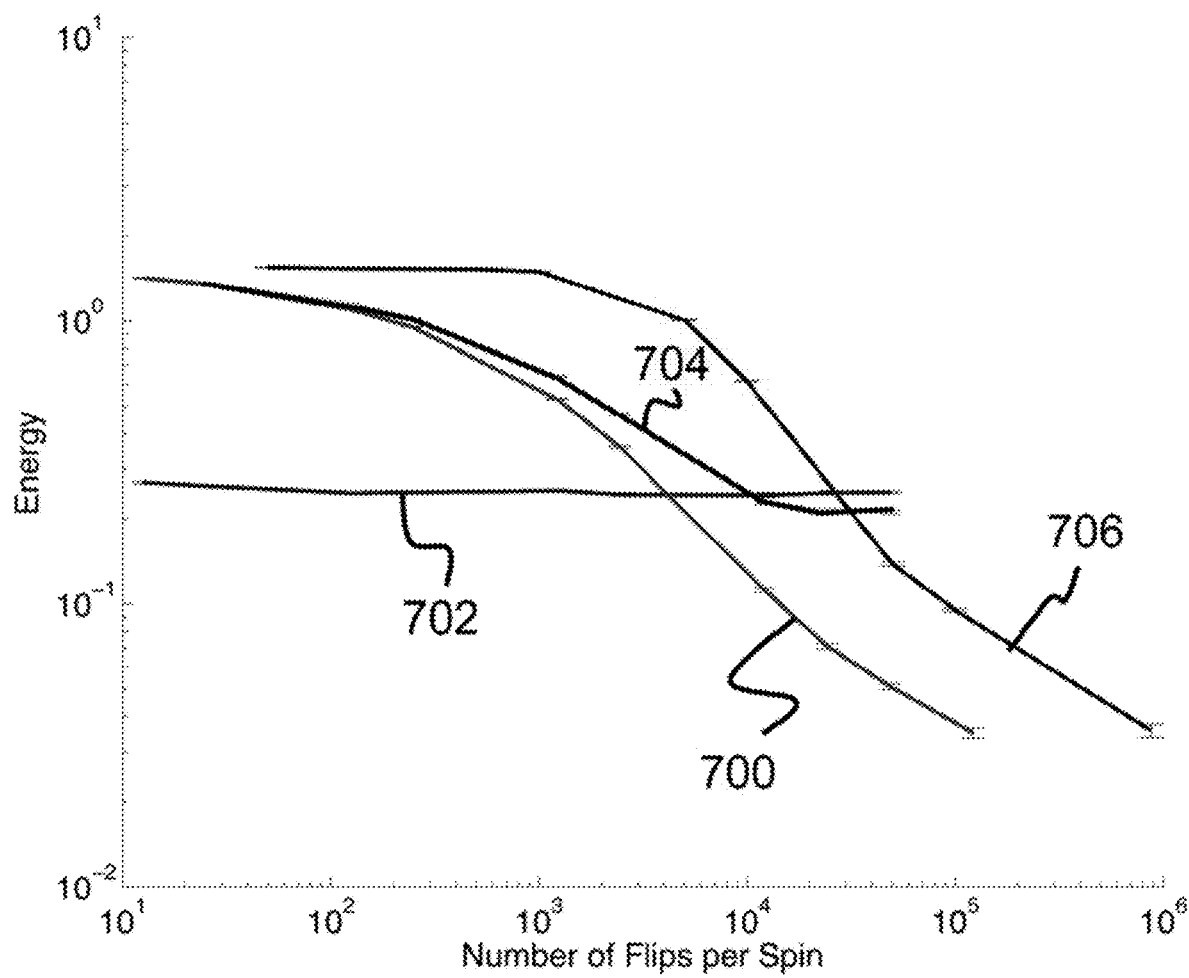
FIG. 7 is a graph comparing the process according to principles of the present invention with state of the art processes.

As shown in FIG. 7, four methods were compared to demonstrate the dramatic improvement of the present process over that of the prior art. The four methods were (1) the optimization method of the present invention 700 using the BTW model (BTW search), (2) random search 702, (3) random search using BTW-avalanche sizes 704, and (4) simulated annealing 706. Random search 702 flips one spin at a time (in a random location) and adopts the new pattern if an improvement in cost is observed. Random search using BTW-avalanche sizes 704 flips randomly as many spins as the size of an avalanche in the BTW model. Thus, the distribution of numbers of spins changed in one iteration step is the same as for the present invention. Simulated annealing 706 changes one spin at a time, evaluates the local energy change, dE, and accepts every improvement in energy, but occasionally also higher energies with probability exp(−dE/kT). The temperature T linearly decreased from 3 to 0 and the constant k was set to 1. For each method, the optimization was run 10 times with different initialization values for $s_i$ and for each different value of the number of optimization steps. Since the number of optimization steps was not equivalent between methods, the total number of required spin flips was compared. This number seems a fair comparison since the computational cost for evaluating a search pattern in this test is linear in the number of spin flips.

As shown in FIG. 7, the process of the present invention 700 was about 7× faster than simulated annealing. The goal was to achieve a minimal energy with as few as possible spin flips. Error bars show standard errors. Random search 702 quickly reaches a low energy state, but then, apparently, gets stuck in a local minimum and cannot improve any further. Interestingly, random search with BTW-avalanche sizes 704 does not do as well as the process of the invention 700. This result suggests that the power-law size distribution itself is not sufficient for achieving a good optimization performance. Instead, the shape of an avalanche matters. Thus, there is no shortcut to the process of this disclosure by simply using a power law generator instead of an SOC model. Given FIG. 7, it is clear that the process as described herein is a dramatic improvement over state of the art image segmentation methods and processes.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for self-organized critical image segmentation, the system comprising:
    one or more processors and a memory, the memory being a non-transitory computer-readable medium having executable instructions encoded thereon, such that upon execution of the instructions, the one or more processors perform operations of:
        generating a delta pattern, the delta pattern being generated from a self-organized critical process;
        altering an initial test pattern based on the delta pattern to generate a new test pattern, the new test pattern being a mask identifying foreground and background pixels in an image;
        generating a new energy score of the new test pattern and iterating operations of generating the delta pattern and altering the initial test pattern until an energy score of the new test pattern is less than an energy score of the initial test pattern;
        replacing the initial test pattern with the new test pattern;
        repeating until a termination condition is reached, at which point the new test pattern provides the image segmentation with each pixel of the new test pattern being assigned with a label; and
        receiving the new test pattern in an object tracking system.

2. The system as set forth in claim 1, wherein the energy score of the new test pattern is determined based on a Markov Random Fields (MRF) energy.

3. The system as set forth in claim 1, wherein the termination condition is selected from a group consisting of a predetermined target energy score, convergence of energy scores of the initial test pattern and new test pattern, or a predetermined iteration number limit is reached.

4. The system as set forth in claim 1, wherein the initial test pattern is randomly generated based on a number of desired distinct regions.

5. The system as set forth in claim 1, wherein in altering an initial test pattern based on the delta pattern, the elements of the initial test pattern have a one-to-one correspondence with image pixels.

6. The system as set forth in claim 1, wherein in altering the initial test pattern based on the delta pattern, if a pixel in the test pattern corresponds to a 1 element in the delta pattern, then a pixel value associated with the pixel is changed from 0 to 1 or from 1 to 0 and all other pixel values are left unchanged.

7. The system as set forth in claim 1, wherein in altering the initial test pattern based on the delta pattern, if a pixel in the test pattern corresponds to a 1 element in the delta pattern, then a pixel value x in the test pattern associated with the pixel is changed from x to (x+1) modulo k where k is the number of distinct image regions, and all other pixel values are left unchanged.

8. The system as set forth in claim 1, wherein in altering an initial test pattern based on the delta pattern, the distinct image regions are foreground and background.

9. The system as set forth in claim 1, wherein in generating the delta pattern, the delta pattern is generated based on a computer model of a sand pile.

10. A method for self-organized critical image segmentation, the method comprising:
    causing one or more processors to execute instructions encoded on a non-transitory computer-readable medium, such that upon execution, the one or more processors perform operations of:
        generating a delta pattern, the delta pattern being generated from a self-organized critical process;
        altering an initial test pattern based on the delta pattern to generate a new test pattern, the new test pattern being a mask identifying foreground and background pixels in an image;
        generating a new energy score of the new test pattern and iterating operations of generating the delta pattern and altering the initial test pattern until an energy score of the new test pattern is less than an energy score of the initial test pattern;
        replacing the initial test pattern with the new test pattern;
        repeating until a termination condition is reached, at which point the new test pattern provides the image segmentation with each pixel of the new test pattern being assigned with a label; and
        receiving the new test pattern in an object tracking system.

11. The method as set forth in claim 10, wherein the energy score of the new test pattern is determined based on a Markov Random Fields (MRF) energy.

12. The method as set forth in claim 10, wherein the termination condition is selected from a group consisting of a predetermined target energy score, convergence of energy scores of the initial test pattern and new test pattern, or a predetermined iteration number limit is reached.

13. The method as set forth in claim 10, wherein the initial test pattern is randomly generated based on a number of desired distinct regions.

14. The method as set forth in claim 10, wherein in altering an initial test pattern based on the delta pattern, the elements of the initial test pattern have a one-to-one correspondence with image pixels.

15. The method as set forth in claim 10, wherein in altering the initial test pattern based on the delta pattern, if a pixel in the test pattern corresponds to a 1 element in the delta pattern, then a pixel value associated with the pixel is changed from 0 to 1 or from 1 to 0 and all other pixel values are left unchanged.

16. The method as set forth in claim 10, wherein in altering the initial test pattern based on the delta pattern, if a pixel in the test pattern corresponds to a 1 element in the delta pattern, then a pixel value x in the test pattern associated with the pixel is changed from x to (x+1) modulo k where k is the number of distinct image regions, and all other pixel values are left unchanged.

17. The method as set forth in claim 10, wherein in altering an initial test pattern based on the delta pattern, the distinct image regions are foreground and background.

18. The method as set forth in claim 10, wherein in generating the delta pattern, the delta pattern is generated based on a computer model of a sand pile.

19. A computer program product for self-organized critical image segmentation, the computer program product comprising:
a non-transitory computer-readable medium having executable instructions encoded thereon, such that upon execution of the instructions by one or more processors, the one or more processors perform operations of:
generating a delta pattern, the delta pattern being generated from a self-organized critical process;
altering an initial test pattern based on the delta pattern to generate a new test pattern, the new test pattern being a mask identifying foreground and background pixels in an image;
generating a new energy score of the new test pattern and iterating operations of generating the delta pattern and altering the initial test pattern until an energy score of the new test pattern is less than an energy score of the initial test pattern;
replacing the initial test pattern with the new test pattern;
repeating until a termination condition is reached, at which point the new test pattern provides the image segmentation with each pixel of the new test pattern being assigned with a label; and
receiving the new test pattern in an object tracking system.

20. The computer program product as set forth in claim 19, wherein the energy score of the new test pattern is determined based on a Markov Random Fields (MRF) energy.

21. The computer program product as set forth in claim 19, wherein the termination condition is selected from a group consisting of a predetermined target energy score, convergence of energy scores of the initial test pattern and new test pattern, or a predetermined iteration number limit is reached.

22. The computer program product as set forth in claim 19, wherein the initial test pattern is randomly generated based on a number of desired distinct regions.

23. The computer program product as set forth in claim 19, wherein in altering an initial test pattern based on the delta pattern, the elements of the initial test pattern have a one-to-one correspondence with image pixels.

24. The computer program product as set forth in claim 19, wherein in altering the initial test pattern based on the delta pattern, if a pixel in the test pattern corresponds to a 1 element in the delta pattern, then a pixel value associated with the pixel is changed from 0 to 1 or from 1 to 0 and all other pixel values are left unchanged.

25. The computer program product as set forth in claim 19, wherein in altering the initial test pattern based on the delta pattern, if a pixel in the test pattern corresponds to a 1 element in the delta pattern, then a pixel value x in the test pattern associated with the pixel is changed from x to (x+1) modulo k where k is the number of distinct image regions, and all other pixel values are left unchanged.

26. The computer program product as set forth in claim 19, wherein in altering an initial test pattern based on the delta pattern, the distinct image regions are foreground and background.

27. The computer program product as set forth in claim 19, wherein in generating the delta pattern, the delta pattern is generated based on a computer model of a sand pile.

* * * * *